(12) United States Patent
Simmons (10) Patent No.: US 10,339,087 B2
(45) Date of Patent: *Jul. 2, 2019

(54) VIRTUAL GENERAL PURPOSE INPUT/OUTPUT FOR A MICROCONTROLLER

(71) Applicant: Microchip Technology Incorporated, Chandler, AZ (US)

(72) Inventor: Michael Simmons, Chandler, AZ (US)

(73) Assignee: MICROSHIP TECHNOLOGY INCORPORATED, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,222

(22) Filed: Feb. 21, 2018

(65) Prior Publication Data

US 2018/0181526 A1 Jun. 28, 2018

Related U.S. Application Data

(63) Continuation of application No. 13/627,378, filed on Sep. 26, 2012, now Pat. No. 9,904,646.

(60) Provisional application No. 61/539,703, filed on Sep. 27, 2011.

(51) Int. Cl.
*G06F 13/40* (2006.01)
(52) U.S. Cl.
CPC ................................. *G06F 13/4068* (2013.01)
(58) Field of Classification Search
CPC .................................................. G06F 13/4068
USPC ........................................................ 710/316
See application file for complete search history.

(56) References Cited

U.S. PATENT DOCUMENTS

| 4,363,108 | A | * | 12/1982 | Lange | G09G 5/222 345/467 |
| 5,136,188 | A | | 8/1992 | Ha et al. | 326/39 |
| 5,309,426 | A | * | 5/1994 | Crouse | H04L 49/351 340/2.1 |
| 5,402,014 | A | | 3/1995 | Ziklik et al. | 326/37 |
| 5,440,515 | A | * | 8/1995 | Chang | G11C 7/22 327/271 |
| 5,736,867 | A | | 4/1998 | Keiser et al. | 326/38 |
| 5,883,844 | A | * | 3/1999 | So | G11C 29/28 365/201 |

(Continued)

FOREIGN PATENT DOCUMENTS

| EP | 2309395 A1 | 4/2011 | G06F 13/40 |
| TW | 386193 B | 4/2000 | G10H 7/00 |

OTHER PUBLICATIONS

"DS70058D: Section 11. I/O Ports," Microchip Technology Incorporated, 12 Pages, dated © 2005.

(Continued)

*Primary Examiner* — Paul R. Myers
(74) *Attorney, Agent, or Firm* — Slayden Grubert Beard PLLC (57) ABSTRACT

A microcontroller includes a general purpose input/output (GPIO) port having a plurality of bits coupled to a plurality of external pins; a first set of registers for providing at least one of first control and data input/output functionality of the GPIO port; a second set of registers for providing at least one of second control and data input/output functionality of the GPIO port; and a multiplexer and associated select register for controlling the multiplexer to control said GPIO port through either said first or second register set.

21 Claims, 4 Drawing Sheets

(56) References Cited

U.S. PATENT DOCUMENTS

| | | | | |
|---|---|---|---|---|
| 6,055,619 | A | 4/2000 | North et al. | 712/36 |
| 6,653,861 | B1 * | 11/2003 | Agrawal | H03K 19/1737 326/39 |
| 6,661,254 | B1 * | 12/2003 | Agrawal | H03K 19/17736 326/38 |
| 6,686,769 | B1 * | 2/2004 | Nguyen | C07K 14/47 326/40 |
| 6,703,860 | B1 * | 3/2004 | Agrawal | H03K 19/17736 326/38 |
| 6,998,871 | B2 | 2/2006 | Mulligan | 326/37 |
| 7,231,536 | B1 * | 6/2007 | Chong | G11C 7/1051 713/400 |
| 7,460,441 | B2 | 12/2008 | Bartling | 368/118 |
| 7,631,211 | B1 * | 12/2009 | Mai | G11C 8/18 326/40 |
| 7,764,213 | B2 | 7/2010 | Bartling et al. | 341/152 |
| 7,937,700 | B1 * | 5/2011 | Klaiber | G06F 9/45533 711/106 |
| 9,904,646 | B2 | 2/2018 | Simmons | |
| 2002/0054612 | A1 * | 5/2002 | Stirk | H04M 17/023 370/535 |
| 2004/0155984 | A1 | 8/2004 | Rhee | 348/705 |
| 2006/0168374 | A1 | 7/2006 | Wray et al. | 710/62 |
| 2008/0246723 | A1 | 10/2008 | Baumbach | 345/156 |
| 2008/0312857 | A1 * | 12/2008 | Sequine | G01D 5/24 702/65 |
| 2009/0167719 | A1 | 7/2009 | Woolley | 345/174 |
| 2009/0309851 | A1 | 12/2009 | Bernstein | 345/174 |
| 2010/0090982 | A1 | 4/2010 | Oba et al. | 345/174 |
| 2010/0181180 | A1 | 7/2010 | Peter | 200/5 R |
| 2010/0253630 | A1 | 10/2010 | Homma et al. | 345/168 |
| 2011/0007028 | A1 | 1/2011 | Curtis et al. | 345/174 |
| 2011/0109577 | A1 | 5/2011 | Lee et al. | 345/173 |
| 2011/0279397 | A1 | 11/2011 | Rimon et al. | 345/173 |

OTHER PUBLICATIONS

"dsPIC30F Family Reference Manual," Microchip Technology Incorporated, 12 pages, dated Dec. 31, 2006.

DS39711B, "Section 12. I/O Ports with Peripheral Pin Select (PPS)," Microchip Technology Incorporated, 24 pages, dated © 2007.

International Search Report and Written Opinion, Application No. PCT/US2012/057430, 10 pages, dated Mar. 13, 2013.

Chinese Office Action, Application No. 201280047282.X, 7 pages, dated Jan. 25, 2016.

Taiwan Office Action, Application No. 101135669, 10 pages, dated Apr. 18, 2016.

Chinese Office Action, Application No. 201280047282.X, 4 pages, dated Jul. 28, 2016.

Taiwan Office Action, Application No. 101135669, 7 pages, dated Jan. 20, 2017.

Korean Office Action, Application No. 20147008324, 7 pages, dated Nov. 21, 2018.

* cited by examiner

REGISTER 3-179: VIRTUAL PORT LAT REGISTER

| R/W-x | R/W-x | R/W-x | R/W-x | R/W-x | R/W-x | R/W-x | R/W-x |
|---|---|---|---|---|---|---|---|
| PBLAT7 | PBLAT6 | PBLAT5 | PBLAT4 | PBLAT3 | PBLAT2 | PBLAT1 | PBLAT0 ← 308 |
| bit 7 | | | | | | | bit 0 | bit 7-0  PBLAT [7:0] VIRTUAL PORT I/O OUTPUT LATCH REGISTER bits

REGISTER 3-180: VIRTUAL PORT PORT REGISTER

| R/W-x | R/W-x | R/W-x | R/W-x | R/W-x | R/W-x | R/W-x | R/W-x |
|---|---|---|---|---|---|---|---|
| PBPORT7 | PBPORT6 | PBPORT5 | PBPORT4 | PBPORT3 | PBPORT2 | PBPORT1 | PBPORT0 ← 310 |
| bit 7 | | | | | | | bit 0 | bit 7-0  PBPORT[7:0]: VIRTUAL PORT I/O VALUE bits

NOTE 1: WRITES TO PBPORT ARE ACTUALLY WRITTEN TO THE CORRESPONDING PBLAT REGISTER. VALUE IN REGISTER IS UPDATED WITH ACTUAL I/O PIN VALUES

REGISTER 3-181: VIRTUAL PORT TRIS REGISTER

| R/W-1 | R/W-1 | R/W-1 | R/W-1 | R/W-1 | R/W-1 | R/W-1 | R/W-1 |
|---|---|---|---|---|---|---|---|
| PBTRIS7 | PBTRIS6 | PBTRIS5 | PBTRIS4 | PBTRIS3 | PBTRIS2 | PBTRIS1 | PBTRIS0 ← 306 |
| bit 7 | | | | | | | bit 0 | bit 7-0  PBTRIS [7:0]: VIRTUAL PORT I/O TRI-STATE CONTROL bits

---

R = READABLE bit

-n = VALUE AT RESET

W = WRITABLE bit

1 = bit IS SET

U = UNIMPLEMENTED bit, READ AS '0'

0 = bit IS CLEARED x = bit IS UNKNOWN

VIRTUAL GENERAL PURPOSE INPUT/OUTPUT FOR A MICROCONTROLLER

CROSS-REFERENCE TO RELATED APPLICATIONS

This application is a continuation of U.S. application Ser. No. 13/627,378 filed Sep. 26, 2012, which claims priority from U.S. Provisional Patent Application No. 61/539,703 filed Sep. 27, 2011, which are both hereby incorporated by reference in their entirety as if fully set forth herein.

BACKGROUND OF THE INVENTION

Technical Field

The present disclosure relates to microcontrollers and, in particular, to general purpose input/output ports in microcontrollers.

Description of the Related Art

A general purpose input/output (GPIO) port is generally understood as a parallel digital input/output port of a microcontroller. With current microcontrollers, GPIO functions are organized by ports (A, B, C, etc.), with each port having a set of registers input/output registers to control it. Furthermore, to control whether the port is used for digital input or digital output, a direction register such as a tri-state control register can be provided. Increasingly, microcontrollers are "low pin count" devices.

When, as a consequence, a large number of peripherals are multiplexed onto each pin, it is unlikely that more than one to three GPIO functions will be available on any given port, once a user allocates the pins necessary for dedicated pin functions, such as UART (universal asynchronous receiver/transmitter), SPI (serial peripheral interface), I2C (Inter-integrated circuit), etc. This means that when the user wants a coherent (atomic, i.e., the ability to read or write the set of GPIO pins with a single CPU instruction) set of GPIO pins with more than a couple of pins, they must access multiple registers to drive data out on or sample data from those pins. This leads to limitations, such as the inability to drive all GPIO pins high at the same time, or to sample all GPIO pins at the same time.

SUMMARY

These and other drawbacks in the prior art are overcome in large part by a system and method according to embodiments of the present invention.

A microcontroller according to embodiments includes a general purpose input/output (GPIO) port having a plurality of bits coupled to a plurality of external pins; a first set of registers for providing at least one of first control and data input/output functionality of the GPIO port; a second set of registers for providing at least one of second control and data input/output functionality of the GPIO port; and a multiplexer and associated select register for controlling the multiplexer to control said GPIO port through either said first or second register set.

In some embodiments, the first and second register set comprise a read register, a write register, and a direction control register. In some embodiments, the port comprises a controllable output driver having an output coupled with an external pin and an input driver having an input coupled with the external pin. In some embodiments, the first and second read register are coupled through a first multiplexer with the output of the input driver, the first and second write register are coupled through a second multiplexer with the input of the output driver, and the first and second direction control register are coupled through a third multiplexer with a control input of the output driver. In some embodiments, the microprocessor further includes a peripheral pin select unit operable to programmably assign an external pin to the second functionality of the GPIO.

An input/output configuration for a processor according to some embodiments include a first plurality of registers comprising a first general purpose input/output configuration selectively coupled to an external pin of the processor; a second plurality of registers comprising a second general purpose input/output configuration selectively coupled to the external pin; and a control register operably coupled to control switching between the first general purpose input/output configuration and the second general purpose input/output configuration. In some embodiments, the input/output configuration includes at least one multiplexer for receiving control inputs from the control register for selecting between the first general purpose input/output configuration and the second general purpose input/output configuration. In some embodiments, the first plurality of registers includes a first read register, a first write register, and a first direction control register; and the second plurality of registers includes a second read register, a second write register, and a second direction control register. In some embodiments, the at least one multiplexer includes a first multiplexer for selecting between the first direction control register and the second direction control register; and a second multiplexer for selecting between the first write register and the second write register. In some embodiments, the input/output configuration includes a controllable output driver having an output coupled with the external pin and an input driver having an input coupled with the external pin.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As will be explained in greater detail below, according to various embodiments, a user can map GPIO pins that are spread across multiple physical ports to a single software port, called a Virtual Port. That is, in some embodiments, a Virtual Port is constructed by mapping unrelated pins to a single "port."

In some embodiments, the mapping employs a remappable pin function, such as the Peripheral Pin Select (PPS) infrastructure, available from Microchip, which provides flexible multiplexing between pins and peripherals, and also employs a dedicated set of extra GPIO registers. It then becomes possible to simultaneously drive or sample multiple GPIOs even though they do not necessarily belong to the same originally assigned port. In other applications, the same port may be used in different configurations that require extensive re-programming of that port. According to an embodiment, at least a second set of registers allows users to set two or more configurations of a GPIO port which can be switched by simply setting at least one bit of a select register.

Figure 1:
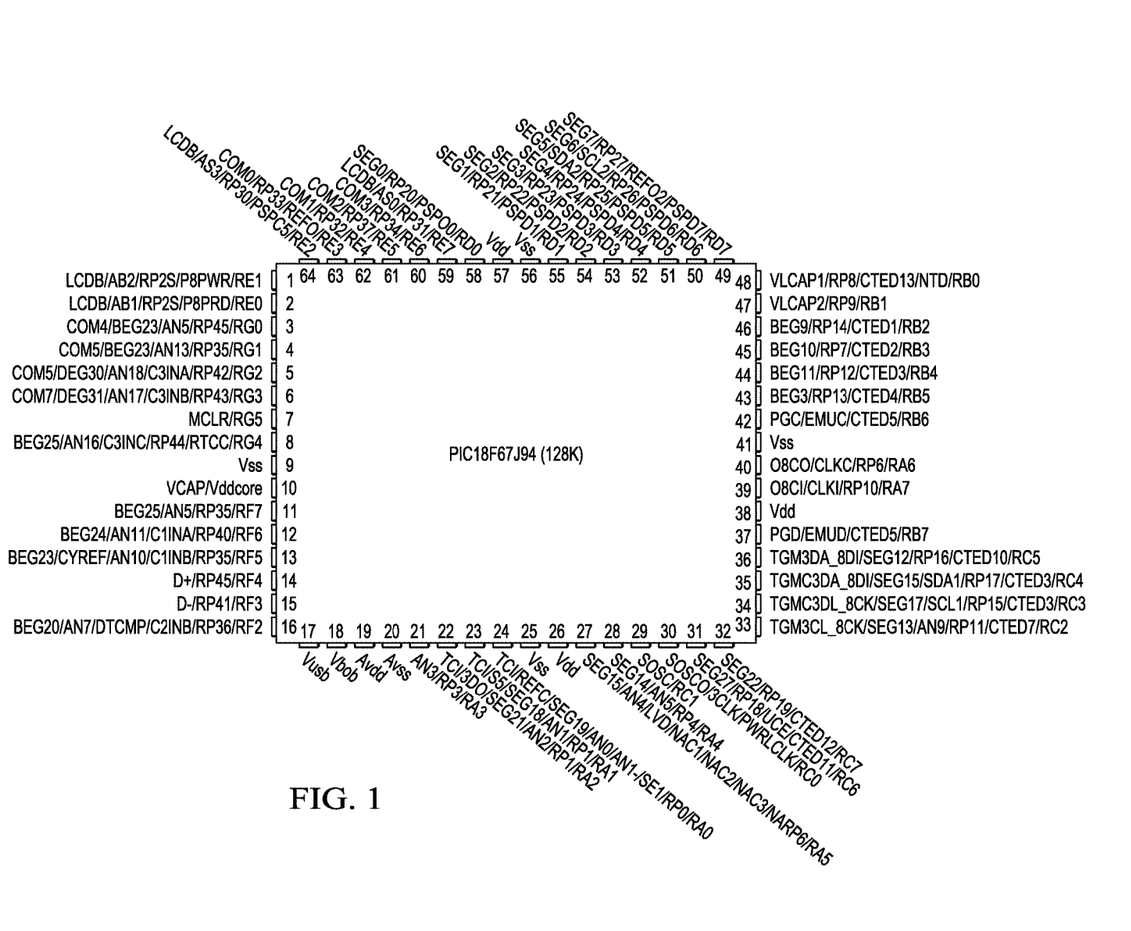
FIG. 1 is a diagram illustrating an exemplary microcontroller pin configuration.

Turning now to the drawings and, with particular attention to FIG. 1, a diagram of an exemplary microcontroller that can be used in accordance with the teachings of the disclosure is shown. The microcontroller 100 may be embodied as a PIC18F67J94, available from Microchip Technologies, Inc., or a similar microcontroller or processor. Microcontroller 100 includes a plurality of pins, many of which are used to implement more than one function. In the example illustrated, pins with the designation "R" are remappable using a Peripheral Pin Select functions. Peripheral Pin Select allows a programmer to map the I/O of most peripherals to a selection of pins.

However, with low pin counts and increasing number of peripherals, users are often constrained in their GPIO to "leftover" pins. Even with PPS (Peripheral Pin Select), board layout may constrain pin selection on a device. If a multi-pin GPIO "port" is required to implement a protocol or control, and all of the pins are not on the same physical port (i.e.—Port A, B, etc.), then multiple instruction cycles are required to read the port, for example with a read register (PORT), write the port, for example with a write register (LAT), or switch directionality of the port, for example with a tri-state register (TRIS) on these pins. With conventional systems, it is impossible to keep cycle coherency on the GPIO port for reads and writes.

Figures 2, 3:
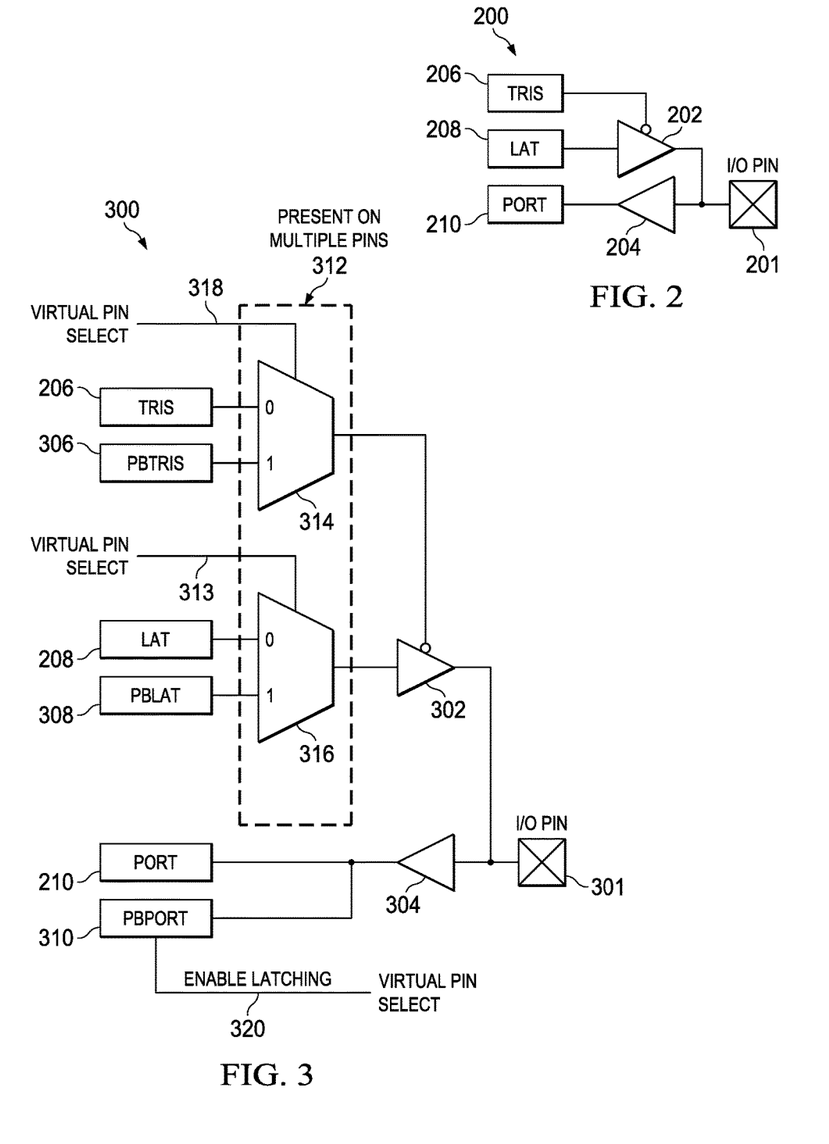
FIG. 2 is a diagram illustrating a conventional GPIO port.
FIG. 3 is a diagram illustrating a GPIO port in accordance with embodiments of the invention.

For example, shown in FIG. 2 is a conventional GPIO port 200. Shown is I/O pin 201, read driver 204 and read register 210 (PORT); and tri-state write driver 202, with a write register (LAT) 208 and select register 206 (TRIS). In operation, the register 206 is used to select the input or output functioning or directionality of the port 200.

According to an embodiment, a virtual port allows a user to allocate any possible GPIO pin to a virtual PORT. As shown in FIG. 3, an existing GPIO port is assigned a shadow function which can be activated by merely setting a single bit switching the functionality from an original configured port to the configuration set in the register assigned to the virtual function.

More particularly, FIG. 3 illustrates an exemplary GPIO virtual port structure according to an embodiment. As shown, the port 300 includes pin 301, drivers 302, 304, and read (PORT) register 210, write (LAT) register 208, and select (TRIS) register 206, which function similarly to conventional ports. However, according to embodiments, the virtual port 300 includes virtual write (PBLAT) register 306, virtual read (PBPORT) register 310, and virtual select (TRIS) register 308. Multiplexers 314, 316 allow users to select between the "real" or virtual port functions. More particularly, in standard operation, the standard port configuration may be used. By selecting using the virtual pin select line(s) 318, 313, 320, a user can select the virtual port function.

The additional logic requires only a minimum of real estate, thus, die cost is kept small. For example, with 40 GPIO pins and 8-pin virtual port, the additional logic requires about 1K gates. However, this requirement can be even further reduced when using an existing PPS.

Generally, the GPIO is considered as a dedicated pin function, and not treated as a peripheral. However, according to various embodiments, the GPIO is treated like any other mappable peripheral. As will be discussed in greater detail below, according to some embodiments, using a remappable pin function infrastructure, such as the PPS infrastructure, which allows for multiplexing between any or almost any pin and any or almost any peripheral, a new "GPIO peripheral" is added to the list of re-mappable peripherals. That is, with a remappable pin function such as PPS, the virtual port looks just like another peripheral device. Within this GPIO peripheral, a new set of dedicated GPIO registers functions identically to pin-based GPIO functions. In some embodiments, this additional GPIO peripheral can be placed as the lowest priority re-mappable peripheral, right above the pin-based GPIO pin functions (which are not part of the re-mappable pin function set), thereby making them behave like the pin-based GPIO pin functions (look and feel), but independent of the physical pin they are mapped to. Consequently, a group of disjointed (i.e.—spread across multiple GPIO "ports") pins can be transformed into what looks like an atomic (i.e.—all on the same GPIO "port") group of pins with minimal additional logic.

Figure 4:
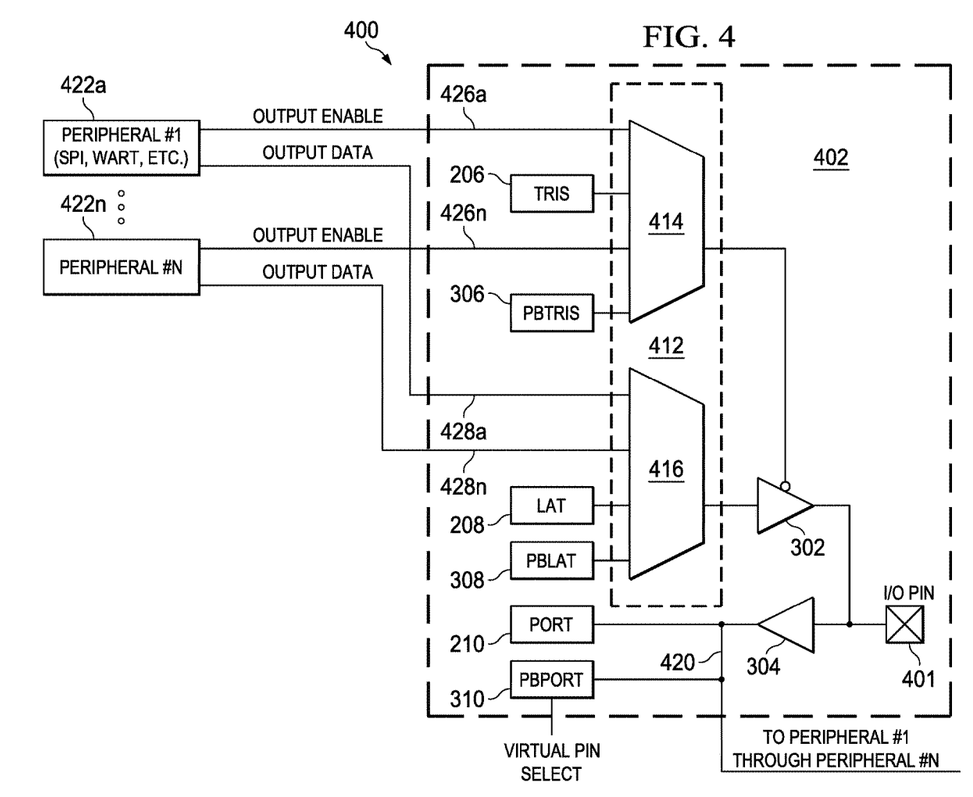
FIG. 4 is a diagram illustrating a GPIO port in accordance with embodiments of the invention.

Turning now to FIG. 4, a diagram 400 showing virtual GPIO in a remappable pin function environment is shown. The environment 400 includes GPIO virtual port structure 402 and peripherals 422a-422n. The GPIO virtual port structure includes pin 401, drivers 302, 304, and read (PORT) register 210, write (LAT) register 208, and select (TRIS) register 206, which function similarly to conventional ports and as described above with reference to FIG. 3. In addition, the virtual port 402 includes virtual write (PBLAT) register 306, virtual read (PBPORT) register 310, and virtual select (TRIS) register 308. Multiplexers 414, 416 allow users to select between the "real" or virtual port functions in a manner similar to that discussed above. By selecting the virtual pin select line(s) (not shown), a user can select the virtual port function.

In addition, in a remappable pin function environment, the multiplexers 414, 416 receive inputs from peripherals 422a, 422n. In particular, in some embodiments, the output enable lines 426a, 426n are provided to multiplexer 414 to enable writing to the pin 401, and output data lines 428a . . . 428n are provided to multiplexer 416 to write data to the pin.

Figure 5:
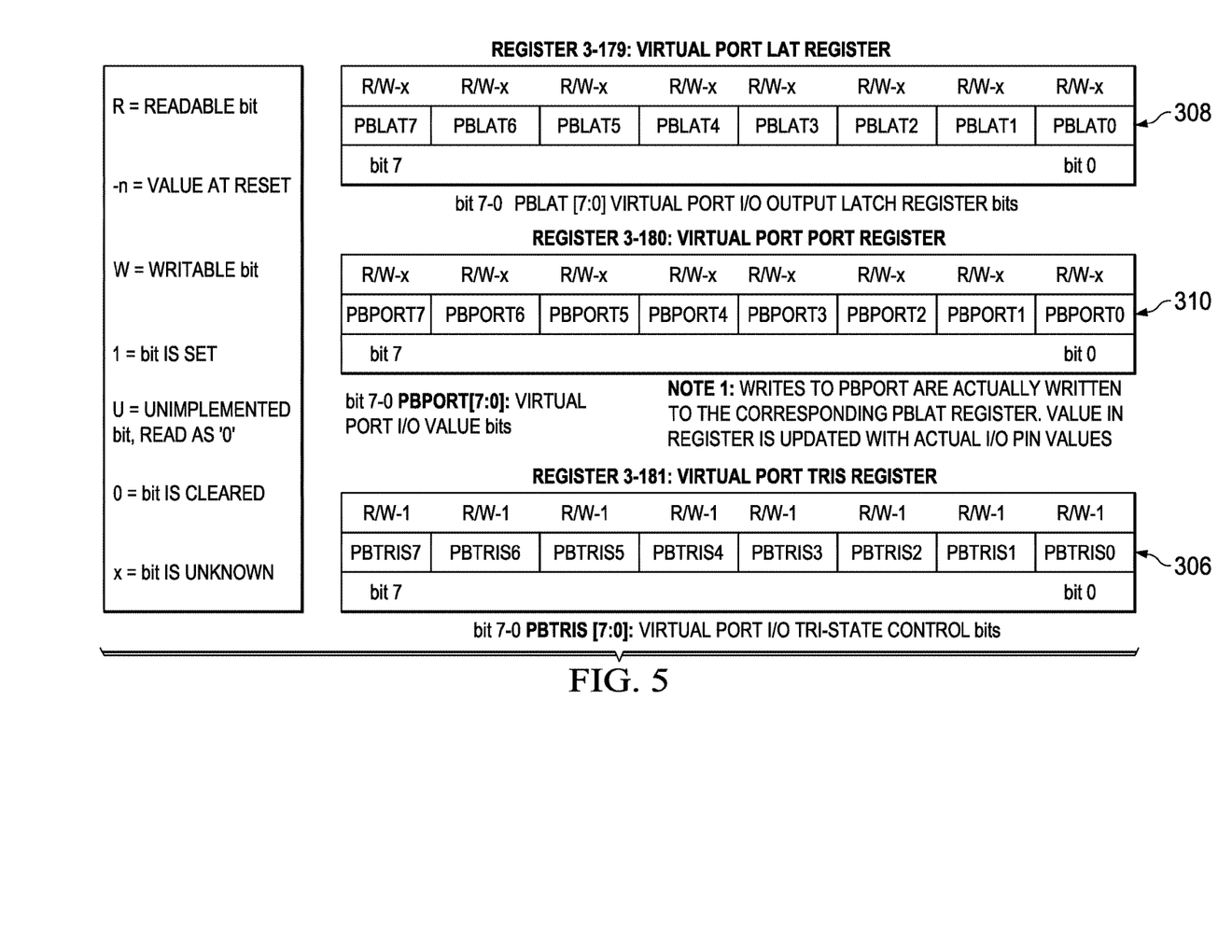
FIG. 5 illustrates exemplary registers for use with a virtual port in accordance with embodiments.

According to various embodiments, a set of separate PBLAT, PBPORT and PBTRIS registers is implemented. For example, shown in FIG. 5 are 8-bit wide LAT (write) 308, port (read) 310, and tris (select) 306 registers for a PIC18 microcontroller. Register width would be the native data width of the architecture, so that register reads/writes are atomic.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A microcontroller comprising a plurality of general purpose input/output (GPIO) ports,
wherein each GPIO port has a plurality of bits;
wherein each GPIO port comprises a first set of registers for providing at least one of first control and data input/output functionality, wherein each bit of the first set of registers is assigned to a respective external pin and a second set of registers for providing at least one of second control and data input/output functionality of a secondary GPIO port, wherein each register of the second set of registers has a plurality of bits;
a multiplexer and associated select register for controlling the multiplexer to control the respective external pin through either said first or second register set; and
a peripheral pin select circuit which is programmable to assign an external pin to a selectable bit of the second set of registers,
wherein the peripheral pin select circuit is programmed to form a virtual GPIO port controlled by a second set of registers having bits from different GPIO ports mapped to the virtual GPIO port.

2. The microcontroller according to claim 1, wherein each of the first and second register sets comprises a read register, a write register, and a direction control register.

3. The microcontroller according to claim 2, wherein each GPIO port comprises for each bit a controllable output driver having an output coupled with an external pin and an input driver having an input coupled with the external pin.

4. The microcontroller according to claim 3, wherein the first and second read register are coupled for each bit through a first multiplexer with the output of the input driver, the first and second write register are coupled for each bit through a second multiplexer with the input of the output driver, and the first and second direction control register are coupled for each bit through a third multiplexer with a control input of the output driver.

5. The microcontroller according to claim 1, wherein the secondary GPIO port is remappable wherein bits of the remappable GPIO port are assignable through the peripheral pin select circuit to any bits of any of the GPIO ports.

6. The microcontroller according to claim 5, wherein bits of the remappable GPIO port correspond to an atomic group of pins.

7. The microcontroller according to claim 1, further comprising a plurality of peripheral devices, wherein the peripheral pin select circuit is further programmable to assign an external pin to one of the peripheral devices.

8. The microcontroller according to claim 7, wherein the peripheral devices comprise at least one of an universal asynchronous receiver/transmitter, a serial peripheral interface, and an inter-integrated circuit.

9. The microcontroller according to claim 1, wherein each GPIO port has 8 bits.

10. A method for operating a microcontroller comprising a plurality of general purpose input/output (GPIO) ports, wherein each port has a plurality of bits, wherein each port comprises a first set of registers for providing at least one of first control and data input/output functionality, wherein each bit of the first set of registers is assigned to a respective external pin and a second set of registers for providing at least one of second control and data input/output functionality of a virtual GPIO port, and a peripheral pin select circuit which is programmable to assign an external pin to one bit of any of the second set of registers, wherein each register of the second set of registers has a plurality of bits, the method comprising:
programming the peripheral pin select circuit to assign bits from different GPIO ports to form the virtual GPIO port; and
when accessing the virtual GPIO port controlling each pin assigned to the virtual GPIO port to switch from an assigned GPIO port to the second register set of the respective pin through respective multiplexers to control respective bits of the virtual GPIO port.

11. The method according to claim 10, wherein each of the first and second register set comprise a read register, a write register, and a direction control register.

12. The method according to claim 10, wherein each GPIO port comprises a controllable output driver having an output coupled with an external pin and an input driver having an input coupled with the external pin.

13. The method according to claim 12, wherein the first and second read register are coupled through a first multiplexer with the output of the input driver, the first and second write register are coupled through a second multiplexer with the input of the output driver, and the first and second direction control register are coupled through a third multiplexer with a control input of the output driver.

14. The method according to claim 10, wherein the virtual GPIO port is remappable, wherein the method further comprises assigning bits of the virtual GPIO port through the peripheral pin select circuit to any bits of any of the GPIO ports.

15. The method according to claim 14, wherein bits of the virtual GPIO port correspond to an atomic group of pins.

16. The method according to claim 15, wherein writing to the virtual GPIO port performs writing to bits from different GPIO ports.

17. The method according to claim 15, wherein reading the virtual GPIO port performs reading bits from different GPIO ports.

18. The method according to claim 10, further comprising a plurality of peripheral devices, wherein the method further comprises: programming the peripheral pin select circuit to assign an external pin to one of the peripheral devices.

19. The method according to claim 18, wherein the peripheral devices comprise at least one of an universal asynchronous receiver/transmitter, a serial peripheral interface, and an inter-integrated circuit.

20. The method according to claim 10, wherein each GPIO port has eight bits.

21. A method for operating a microcontroller comprising a plurality of general purpose input/output (GPIO) ports, wherein each port has a plurality of bits, wherein each port comprises a first set of registers for providing at least one of first control and data input/output functionality, wherein each bit of the first set of registers is assigned to a respective external pin and a second set of registers for providing at least one of second control and data input/output functionality of a virtual GPIO port, and a peripheral pin select circuit which is programmable to assign an external pin to one bit of any of the second set of registers, wherein each register of the second set of registers has a plurality of bits, the method comprising:
  programming the peripheral pin select circuit to assign a first external pin being assigned to a bit of a first GPIO port to be controlled by a one bit of the virtual GPIO port;
  programming the peripheral pin select circuit to assign a second external pin being assigned to a bit of a second GPIO port different from the first GPIO port to be controlled by another bit of the virtual GPIO port; and
  when accessing the virtual GPIO port controlling the first and second external pin through the second register set.

* * * * *

UNITED STATES PATENT AND TRADEMARK OFFICE
CERTIFICATE OF CORRECTION

PATENT NO. : 10,339,087 B2
APPLICATION NO. : 15/901222
DATED : July 2, 2019
INVENTOR(S) : Michael Simmons Page 1 of 1

It is certified that error appears in the above-identified patent and that said Letters Patent is hereby corrected as shown below:

On the Title Page

Item (73) Assignee: 'MICROSHIP TECHNOLOGY INCORPORATED, Chandler, AZ (US)'..." ---Change to--- "...MICROCHIP TECHNOLOGY INCORPORATED, Chandler, AZ (US)'..."

Signed and Sealed this
Sixth Day of August, 2019

Andrei Iancu
*Director of the United States Patent and Trademark Office*